US012693981B2

(12) United States Patent
Montero et al.

(10) Patent No.: US 12,693,981 B2
(45) Date of Patent: Jul. 28, 2026

(54) EXPLOITING VIRTUAL ADDRESS (VA) SPATIAL LOCALITY USING TRANSLATION LOOKASIDE BUFFER (TLB) ENTRY COMPRESSION IN PROCESSOR-BASED DEVICES

(71) Applicant: QUALCOMM Incorporated, San Diego, CA (US)

(72) Inventors: Adrian Montero, Austin, TX (US); Sushmitha Ayyanar, San Jose, CA (US); Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/168,857

(22) Filed: Feb. 14, 2023

(65) Prior Publication Data
US 2024/0273033 A1 Aug. 15, 2024

(51) Int. Cl.
*G06F 12/1027* (2016.01)

(52) U.S. Cl.
CPC .. *G06F 12/1027* (2013.01); *G06F 2212/1016* (2013.01)

(58) Field of Classification Search
CPC ...................... G06F 12/1027; G06F 2212/1016
USPC ......................................................... 711/207
See application file for complete search history.

(56) References Cited

U.S. PATENT DOCUMENTS 5,282,274 A 1/1994 Liu
5,586,283 A 12/1996 Lopez-Aguado et al.

6,069,638 A 5/2000 Porterfield
11,176,055 B1 11/2021 Mukherjee et al.
2007/0094475 A1 4/2007 Bridges et al.
(Continued)

FOREIGN PATENT DOCUMENTS

CN 114780452 A 7/2022

OTHER PUBLICATIONS

Gorman, M., "Understanding the Linux Virtual Memory Manager," The Linux Kernel Archives, Jul. 9, 2007, available from the Internet: [URL: https://www.kernel.org/doc/gorman/pdf/understand. pdf], 731 pages.
Pham, B. et al., "CoLT: Coalesced Large-Reach TLBs," 2012 45th Annual IEEE/ACM International Symposium on Microarchitecture (MICRO 2012), Dec. 1-5, 2012, Vancouver, BC, Canada, IEEE, 12 pages.
(Continued)

*Primary Examiner* — Gautam Sain
(74) *Attorney, Agent, or Firm* — W&T

(57) ABSTRACT

Exploiting virtual address (VA) spatial locality using translation lookaside buffer (TLB) entry compression in processor-based devices is disclosed herein. In some aspects, a processor-based device comprises a TLB, comprising multiple TLB entries each comprising a tag and a plurality of data portions, and further comprises a memory management unit (MMU). The MMU is configured to receive a memory access request comprising a VA, and determine that a TLB access to the TLB for a page VA of the VA results in a miss. In response, the MMU generates a TLB entry, wherein the tag of the TLB entry comprises the page VA, the plurality of data portions comprises a corresponding plurality of page PAs, a first data portion thereof comprising a page PA corresponding to the page VA, and one or more second data portions thereof comprising corresponding PAs of next sequential page VAs following the page VA.

20 Claims, 7 Drawing Sheets

(56) References Cited

U.S. PATENT DOCUMENTS

| | | | |
|---|---|---|---|
| 2014/0201494 A1 | 7/2014 | Venkumahanti et al. | |
| 2015/0339228 A1 | 11/2015 | Heddes et al. | |
| 2015/0356024 A1* | 12/2015 | Loh ..................... | G06F 12/1054 |
| | | | 711/113 |
| 2016/0306746 A1* | 10/2016 | Podaima ............. | G06F 12/1036 |
| 2017/0315927 A1 | 11/2017 | Loh et al. | |
| 2018/0004678 A1* | 1/2018 | Bogusz .............. | G06F 12/0215 |
| 2019/0188149 A1* | 6/2019 | Abhishek Raja ... | G06F 12/0891 |
| 2019/0205264 A1 | 7/2019 | Varghese et al. | |
| 2019/0227947 A1 | 7/2019 | Keppel et al. | |
| 2020/0192585 A1* | 6/2020 | Parker ................ | G06F 12/1458 |
| 2021/0089467 A1 | 3/2021 | Prasad et al. | |
| 2022/0318158 A1 | 10/2022 | Durham et al. | |
| 2024/0273035 A1 | 8/2024 | Montero et al. | |

OTHER PUBLICATIONS

Pham, B et al.,. "Large Pages and Lightweight Memory Management in Virtualized Environments: Can You Have it Both Ways?" 2015 48th Annual IEEE/ACM International Symposium on Microarchitecture (MICRO 2015), Dec. 5-9, 2015, Waikiki, HI, USA, IEEE, 12 pages.

Yan, Z. et al., "Translation Ranger: Operating System Support for Contiguity-Aware TLBs," 2019 ACM/IEEE 46th Annual International Symposium on Computer Architecture (ISCA), Jun. 22-26, 2019, Phoenix, AZ, USA, IEEE, 13 pages.

International Search Report and Written Opinion for International Patent Application No. PCT/US2024/011234, mailed Apr. 22, 2024, 13 pages.

* cited by examiner

300

302

RECEIVE, BY A MEMORY MANAGEMENT UNIT (MMU) (130) OF A PROCESSOR-BASED DEVICE (100), A FIRST MEMORY ACCESS REQUEST (212) COMPRISING A FIRST VIRTUAL ADDRESS (VA) (214)

304

DETERMINE, BY THE MMU (130), THAT A FIRST TRANSLATION LOOKASIDE BUFFER (TLB) ACCESS (220) TO A TLB (132) OF THE PROCESSOR-BASED DEVICE (100) FOR A FIRST PAGE VA (218) OF THE FIRST VA (214) RESULTS IN A MISS

306

RESPONSIVE TO DETERMINING THAT THE FIRST TLB ACCESS (220) TO THE TLB (132) FOR THE FIRST PAGE VA (218) OF THE FIRST VA (214) RESULTS IN THE MISS, GENERATE, BY THE MMU (130), A TLB ENTRY (138(0)) FOR THE FIRST PAGE VA (218), WHEREIN:
- THE TLB ENTRY (138(0)) COMPRISES A TAG (140(0)) THAT COMPRISES THE FIRST PAGE VA (218);
- THE TLB ENTRY (138(0)) COMPRISES A PLURALITY OF DATA PORTIONS (142(0)-142(1)) THAT COMPRISES A CORRESPONDING PLURALITY OF PAGE PHYSICAL ADDRESSES (PAs) (206(0)-206(1));
- A FIRST DATA PORTION (142(0)) OF THE PLURALITY OF DATA PORTIONS (142(0)-142(1)) COMPRISES A PAGE PA (206(0)) CORRESPONDING TO THE FIRST PAGE VA (218);
- AND ONE OR MORE SECOND DATA PORTIONS (142(1)) OF THE PLURALITY OF DATA PORTIONS (142(0)-142(1)) COMPRISE CORRESPONDING ONE OR MORE PAGE PAs (206(1)) OF CORRESPONDING NEXT SEQUENTIAL PAGE VAs FOLLOWING THE FIRST PAGE VA (218)

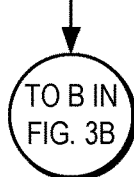

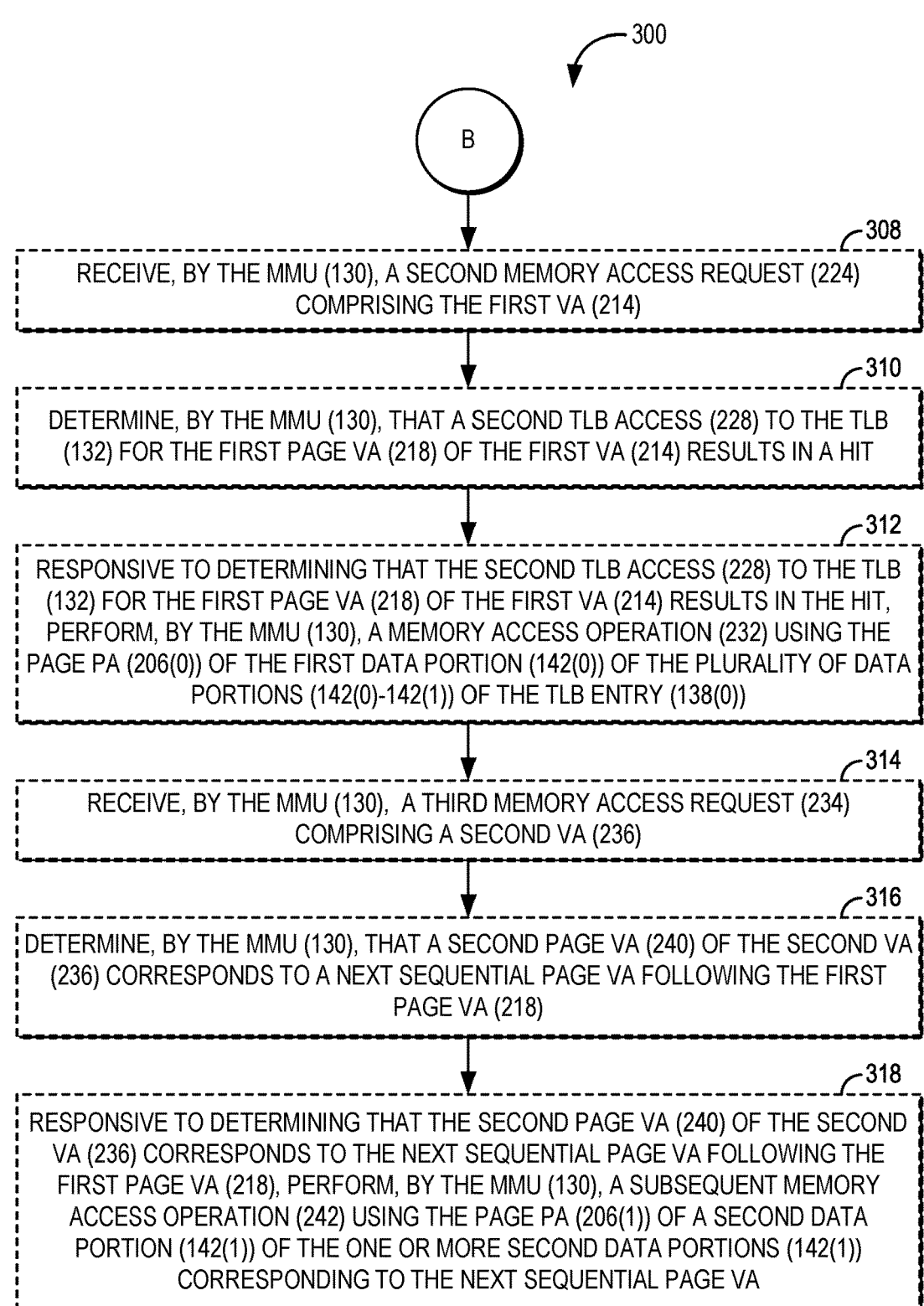

300

B

308
RECEIVE, BY THE MMU (130), A SECOND MEMORY ACCESS REQUEST (224)
COMPRISING THE FIRST VA (214)

310
DETERMINE, BY THE MMU (130), THAT A SECOND TLB ACCESS (228) TO THE TLB
(132) FOR THE FIRST PAGE VA (218) OF THE FIRST VA (214) RESULTS IN A HIT

312
RESPONSIVE TO DETERMINING THAT THE SECOND TLB ACCESS (228) TO THE TLB
(132) FOR THE FIRST PAGE VA (218) OF THE FIRST VA (214) RESULTS IN THE HIT,
PERFORM, BY THE MMU (130), A MEMORY ACCESS OPERATION (232) USING THE
PAGE PA (206(0)) OF THE FIRST DATA PORTION (142(0)) OF THE PLURALITY OF DATA
PORTIONS (142(0)-142(1)) OF THE TLB ENTRY (138(0))

314
RECEIVE, BY THE MMU (130), A THIRD MEMORY ACCESS REQUEST (234)
COMPRISING A SECOND VA (236)

316
DETERMINE, BY THE MMU (130), THAT A SECOND PAGE VA (240) OF THE SECOND VA
(236) CORRESPONDS TO A NEXT SEQUENTIAL PAGE VA FOLLOWING THE FIRST
PAGE VA (218)

318
RESPONSIVE TO DETERMINING THAT THE SECOND PAGE VA (240) OF THE SECOND
VA (236) CORRESPONDS TO THE NEXT SEQUENTIAL PAGE VA FOLLOWING THE
FIRST PAGE VA (218), PERFORM, BY THE MMU (130), A SUBSEQUENT MEMORY
ACCESS OPERATION (242) USING THE PAGE PA (206(1)) OF A SECOND DATA
PORTION (142(1)) OF THE ONE OR MORE SECOND DATA PORTIONS (142(1))
CORRESPONDING TO THE NEXT SEQUENTIAL PAGE VA

FIG. 3B

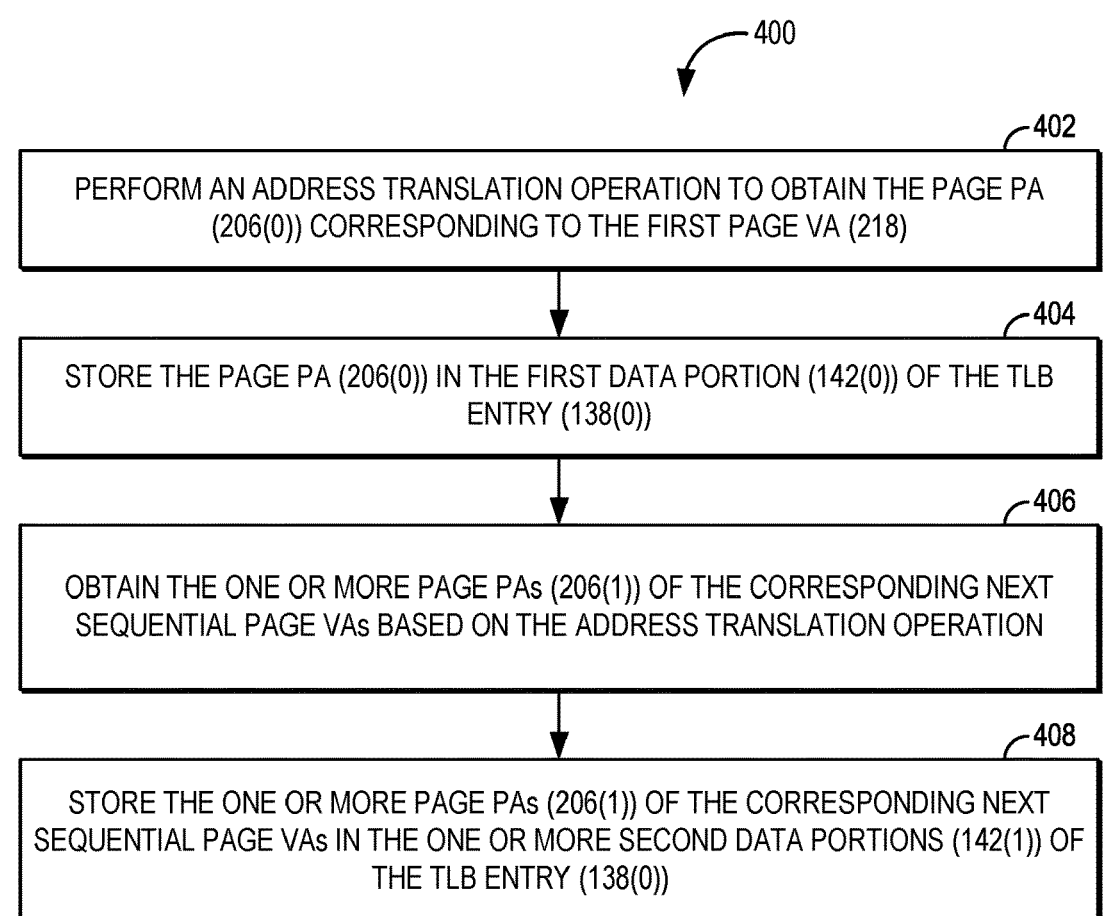

400

402

PERFORM AN ADDRESS TRANSLATION OPERATION TO OBTAIN THE PAGE PA (206(0)) CORRESPONDING TO THE FIRST PAGE VA (218)

404

STORE THE PAGE PA (206(0)) IN THE FIRST DATA PORTION (142(0)) OF THE TLB ENTRY (138(0))

406

OBTAIN THE ONE OR MORE PAGE PAs (206(1)) OF THE CORRESPONDING NEXT SEQUENTIAL PAGE VAs BASED ON THE ADDRESS TRANSLATION OPERATION

408

STORE THE ONE OR MORE PAGE PAs (206(1)) OF THE CORRESPONDING NEXT SEQUENTIAL PAGE VAs IN THE ONE OR MORE SECOND DATA PORTIONS (142(1)) OF THE TLB ENTRY (138(0))

FIG. 4

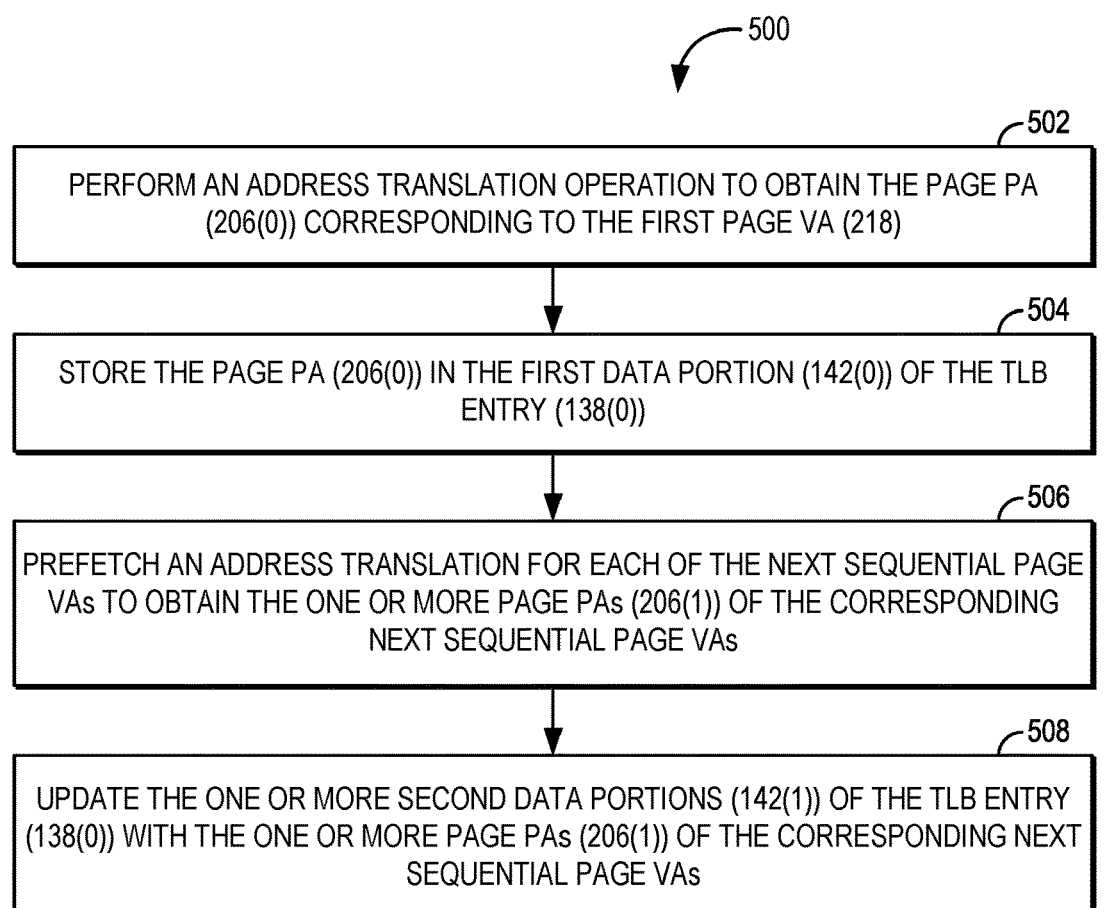

PERFORM AN ADDRESS TRANSLATION OPERATION TO OBTAIN THE PAGE PA (206(0)) CORRESPONDING TO THE FIRST PAGE VA (218)

STORE THE PAGE PA (206(0)) IN THE FIRST DATA PORTION (142(0)) OF THE TLB ENTRY (138(0))

PREFETCH AN ADDRESS TRANSLATION FOR EACH OF THE NEXT SEQUENTIAL PAGE VAs TO OBTAIN THE ONE OR MORE PAGE PAs (206(1)) OF THE CORRESPONDING NEXT SEQUENTIAL PAGE VAs

UPDATE THE ONE OR MORE SECOND DATA PORTIONS (142(1)) OF THE TLB ENTRY (138(0)) WITH THE ONE OR MORE PAGE PAs (206(1)) OF THE CORRESPONDING NEXT SEQUENTIAL PAGE VAs

FIG. 5

EXPLOITING VIRTUAL ADDRESS (VA) SPATIAL LOCALITY USING TRANSLATION LOOKASIDE BUFFER (TLB) ENTRY COMPRESSION IN PROCESSOR-BASED DEVICES

BACKGROUND

I. Field of the Disclosure

The technology of the disclosure relates generally to translation lookaside buffers (TLB) in processor-based devices.

II. Background

Microprocessors, also referred to herein as "processors," perform computational tasks for a wide variety of applications. Conventional processors make use of virtual memory, which refers to a memory management mechanism that maps memory addresses (i.e., virtual addresses or VAs) referenced by executing processes to physical addresses (PAs) within system memory. By using virtual memory, processor-based systems are able to provide access to a virtual memory space larger than the actual physical memory space, and to enhance inter-process security through memory isolation. The mapping of VAs to their corresponding PAs is accomplished using data structures known as page tables. To further improve performance, page table entries retrieved from the page tables during VA-to-PA translations are cached in a data structure referred to as a translation lookaside buffer, or TLB.

While the use of a TLB may be effective in reducing memory access latency within a processor, the TLB may require a significant portion of the physical area of the processor. Accordingly, it may be desirable to reduce the area occupied by the TLB without negatively affecting the TLB's performance, and/or to improve the TLB's performance without increasing the physical footprint of the TLB.

SUMMARY OF THE DISCLOSURE

Aspects disclosed in the detailed description include exploiting virtual address (VA) spatial locality using translation lookaside buffer (TLB) entry compression in processor-based devices. Related apparatus and methods are also disclosed. In this regard, in some exemplary aspects disclosed herein, a processor-based device comprises a memory management unit (MMU) that is communicatively coupled to a TLB that provides a plurality of TLB entries. Each TLB entry is configured to store a tag that includes a page VA, and to further store a plurality of data portions that each store a page physical address (PA). A first data portion of the plurality of data portions stores a page PA that corresponds to the page VA of the tag (i.e., the page PA resulting from an address translation operation for the page VA). Additionally, one or more second data portions store one or more page PAs that correspond to next sequential page VAs that follow the page VA of the tag.

In exemplary operation, the MMU is configured to receive a first memory access request comprising a first VA. The MMU determines that a first TLB access to the TLB for a first page VA of the first VA results in a miss, and, in response, generates a TLB entry for the first page VA. Some aspects may provide that generating the TLB entry includes the MMU first performing an address translation operation to obtain the page PA corresponding to the first page VA, and storing the page PA in the first data portion of the TLB entry. In aspects in which the one or more page PAs corresponding to the next sequential page VAs are contiguous in a physical memory space, the MMU may obtain the one or more page PAs of the next sequential page VAs based on the address translation operation (e.g., by obtaining descriptors for the page PAs as part of the same address translation operation). The MMU then stores the one or more page PAs corresponding to the next sequential page VAs in the respective one or more second data portions of the TLB entry. In aspects in which the one or more page PAs are not contiguous in a physical memory space, the MMU may subsequently prefetch an address translation for each of the next sequential page VAs to obtain the one or more page PAs. The MMU then updates the one or more second data portions of the TLB entry with the one or more page PAs corresponding to the next sequential page VAs.

Some aspects may provide that the MMU further receives a second memory access request comprising the first VA, and determines that a second TLB access to the TLB for the first page VA of the first VA results in a hit. Responsive to the hit on the TLB, the MMU performs a memory access operation using the page PA of the first data portion of the plurality of data portions of the TLB entry. Some aspects may further provide that the MMU receives a third memory access request comprising a second VA, and determines that a second page VA of the second VA corresponds to a next sequential page VA following the first page VA. The MMU then performs a subsequent memory access operation using the page PA of a second data portion of the one or more second data portions corresponding to the next sequential page VA.

In another aspect, a processor-based device is disclosed. The processor-based device comprises a TLB that comprises a plurality of TLB entries, wherein each TLB entry comprises a tag and a plurality of data portions. The processor-based device further comprises an MMU configured to receive a first memory access request comprising a first VA. The MMU is further configured to determine that a first TLB access to the TLB for a first page VA of the first VA results in a miss. The MMU is also configured to, responsive to determining that the first TLB access to the TLB for the first page VA of the first VA results in the miss, generate a TLB entry for the first page VA, wherein the tag of the TLB entry comprises the first page VA, the plurality of data portions comprises a corresponding plurality of page PAs, a first data portion of the plurality of data portions comprises a page PA corresponding to the first page VA, and one or more second data portions of the plurality of data portions comprise corresponding one or more page PAs of corresponding next sequential page VAs following the first page VA.

In another aspect, a processor-based device is disclosed. The processor-based device comprises means for receiving a first memory access request comprising a first VA. The processor-based device further comprises means for determining that a first TLB access to a TLB of the processor-based device for a first page VA of the first VA results in a miss. The processor-based device also comprises means for generating a TLB entry for the first page VA responsive to determining that the first TLB access to the TLB for the first page VA of the first VA results in the miss, wherein the TLB entry comprises a tag that comprises the first page VA, the TLB entry comprises a plurality of data portions that comprises a corresponding plurality of page PAs, a first data portion of the plurality of data portions comprises a page PA corresponding to the first page VA, and one or more second data portions of the plurality of data portions comprise corresponding one or more page PAs of corresponding next sequential page VAs following the first page VA.

In another aspect, a method for exploiting VA spatial locality using TLB entry compression in processor-based devices is disclosed. The method comprises receiving, by an MMU of a processor-based device, a first memory access request comprising a first VA. The method further comprises determining, by the MMU, that a first TLB access to a TLB of the processor-based device for a first page VA of the first VA results in a miss. The method also comprises, responsive to determining that the first TLB access to the TLB for the first page VA of the first VA results in the miss, generating, by the MMU, a TLB entry for the first page VA, wherein the TLB entry comprises a tag that comprises the first page VA, the TLB entry comprises a plurality of data portions that comprises a corresponding plurality of page PAs, a first data portion of the plurality of data portions comprises a page PA corresponding to the first page VA, and one or more second data portions of the plurality of data portions comprise corresponding one or more page PAs of corresponding next sequential page VAs following the first page VA.

In another aspect, a non-transitory computer-readable medium is disclosed. The non-transitory computer-readable medium stores computer-executable instructions that, when executed, cause a processor of a processor-based device to receive a first memory access request comprising a first VA. The computer-executable instructions further cause the processor to determine that a first TLB access to a TLB of the processor-based device for a first page VA of the first VA results in a miss. The computer-executable instructions also cause the processor to, responsive to determining that the first TLB access to the TLB for the first page VA of the first VA results in the miss, generate a TLB entry for the first page VA, wherein the TLB entry comprises a tag that comprises the first page VA, the TLB entry comprises a plurality of data portions that comprises a corresponding plurality of page PAs, a first data portion of the plurality of data portions comprises a page PA corresponding to the first page VA, and one or more second data portions of the plurality of data portions comprise corresponding one or more page PAs of corresponding next sequential page VAs following the first page VA.

BRIEF DESCRIPTION OF THE FIGURES

FIGS. 3A and 3B provide a flowchart illustrating exemplary operations of the MMU and the TLB of FIGS. 1 and 2 for exploiting VA spatial locality using TLB entry compression, according to some aspects;

FIG. 4 provides a flowchart illustrating exemplary operations for obtaining physical addresses (PAs) that are contiguous within a physical memory space, according to some aspects;

FIG. 5 provides a flowchart illustrating exemplary operations for obtaining PAs that are not contiguous within a physical memory space, according to some aspects.

DETAILED DESCRIPTION

Figure 1:
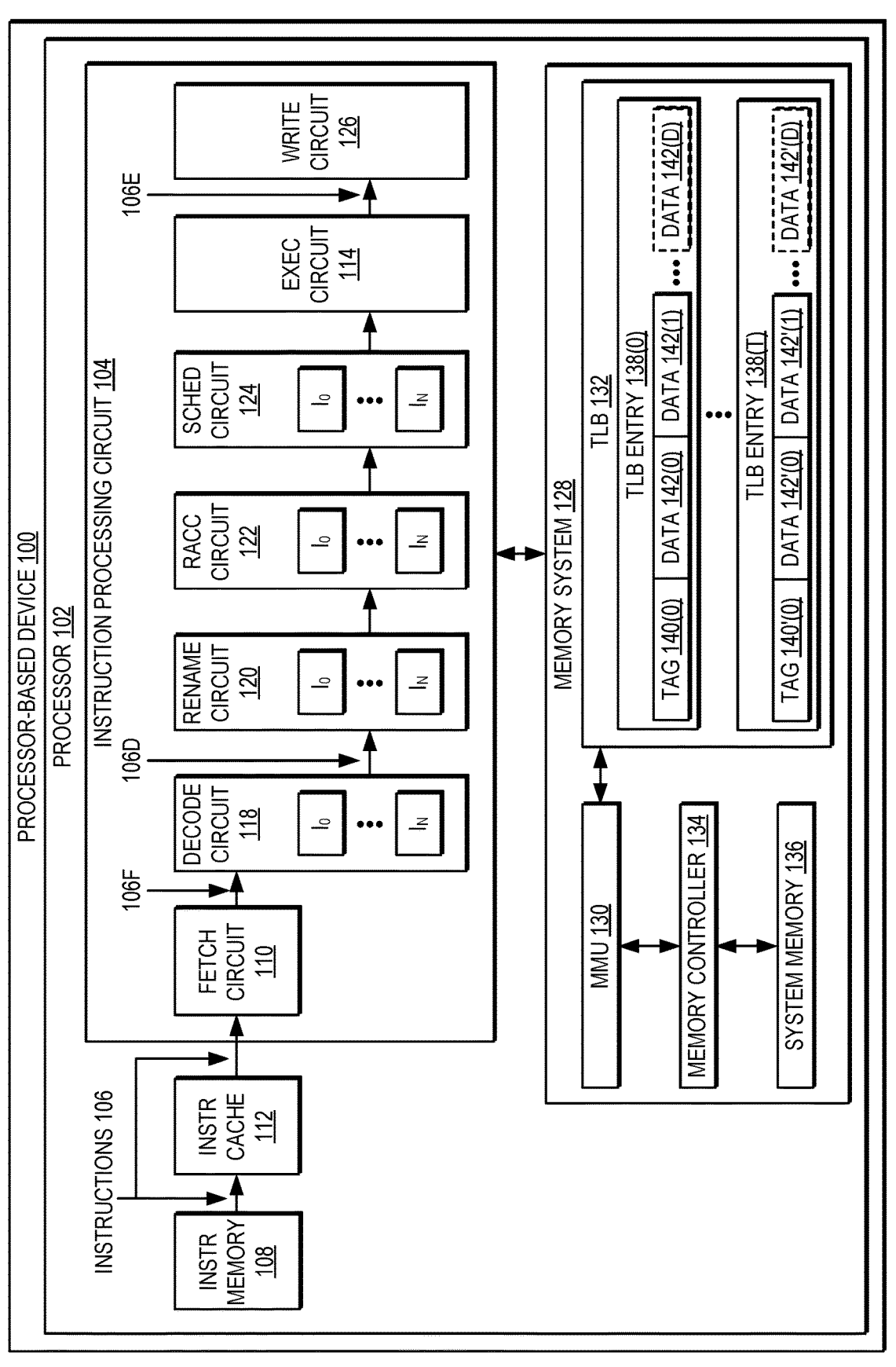
FIG. 1 is a block diagram of an exemplary processor-based device including a memory management unit (MMU) and a translation lookaside buffer (TLB) configured to exploit virtual address (VA) spatial locality using TLB entry compression, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include exploiting virtual address (VA) spatial locality using translation lookaside buffer (TLB) entry compression in processor-based devices. Related apparatus and methods are also disclosed. In this regard, in some exemplary aspects disclosed herein, a processor-based device comprises a memory management unit (MMU) that is communicatively coupled to a TLB that provides a plurality of TLB entries. Each TLB entry is configured to store a tag that includes a page VA, and to further store a plurality of data portions that each store a page physical address (PA). A first data portion of the plurality of data portions stores a page PA that corresponds to the page VA of the tag (i.e., the page PA resulting from an address translation operation for the page VA). Additionally, one or more second data portions store one or more page PAs that correspond to next sequential page VAs following the page VA of the tag.

In exemplary operation, the MMU is configured to receive a first memory access request comprising a first VA. The MMU determines that a first TLB access to the TLB for a first page VA of the first VA results in a miss, and, in response, generates a TLB entry for the first page VA. Some aspects may provide that generating the TLB entry includes the MMU first performing an address translation operation to obtain the page PA corresponding to the first page VA, and storing the page PA in the first data portion of the TLB entry. In aspects in which the one or more page PAs corresponding to the next sequential page VAs are contiguous in a physical memory space, the MMU may obtain the one or more page PAs of the next sequential page VAs based on the address translation operation (e.g., by obtaining descriptors for the page PAs as part of the same address translation operation). The MMU then stores the one or more page PAs corresponding to the next sequential page VAs in the respective one or more second data portions of the TLB entry. In aspects in which the one or more page PAs are not contiguous in a physical memory space, the MMU may subsequently prefetch an address translation for each of the next sequential page VAs to obtain the one or more page PAs. The MMU then updates the one or more second data portions of the TLB entry with the one or more page PAs corresponding to the next sequential page VAs.

Some aspects may provide that the MMU further receives a second memory access request comprising the first VA, and determines that a second TLB access to the TLB for the first page VA of the first VA results in a hit. Responsive to the hit on the TLB, the MMU performs a memory access operation using the page PA of the first data portion of the plurality of data portions of the TLB entry. Some aspects may further provide that the MMU receives a third memory access request comprising a second VA, and determines that a second page VA of the second VA corresponds to a next sequential page VA following the first page VA. The MMU then performs a subsequent memory access operation using the page PA of a second data portion of the one or more second data portions corresponding to the next sequential page VA.

In this regard, FIG. 1 is a diagram of an exemplary processor-based device 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based device 100. In the example of FIG. 1, the processor 102 includes an instruction processing circuit 104 that includes one or more instruction pipelines $I_0-I_N$ for processing instructions 106 fetched from an instruction memory (captioned "INSTR MEMORY" in FIG. 1) 108 by a fetch circuit 110 for execution. The instruction memory 108 may be provided in or as part of a system memory in the processor-based device 100, as a non-limiting example. An instruction cache (captioned "INSTR CACHE" in FIG. 1) 112 may also be provided in the processor 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0-I_N$ in the instruction processing circuit 104 to be pre-processed, before the fetched instructions 106F reach an execution circuit (captioned "EXEC CIRCUIT" in FIG. 1) 114 to be executed. The instruction pipelines $I_0-I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required encoded in the decoded instruction 106D may also be used to determine in which instruction pipeline $I_0-I_N$ the decoded instructions 106D should be placed. In this example, the decoded instructions 106D are placed in one or more of the instruction pipelines $I_0-I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned "RACC CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

Also, in the instruction processing circuit 104, a scheduler circuit (captioned "SCHED CIRCUIT" in FIG. 1) 124 is provided in the instruction pipeline $I_0-I_N$ and is configured to store decoded instructions 106D in reservation entries until all source register operands for the decoded instruction 106D are available. The scheduler circuit 124 issues decoded instructions 106D that are ready to be executed to the execution circuit 114. A write circuit 126 is also provided in the instruction processing circuit 104 to write back or commit produced values from executed instructions 106E to memory (such as the PRF), cache memory, or system memory.

As seen in FIG. 1, the processor-based device 100 further includes a memory system 128 providing an MMU 130 that is configured to manage memory accesses. The MMU 130 is communicatively coupled to a TLB 132 for caching recently used VA-to-PA translations for memory pages containing instructions or data to be retrieved. It is to be understood that, while the TLB 132 of FIG. 1 is illustrated as an element separate from the MMU 130 for the sake of clarity, the TLB 132 in some aspects may be implemented as a constituent element of the MMU 130. The MMU 130 of FIG. 1 is also communicatively coupled to a memory controller 134 that is configured to perform memory read and write operations on a system memory 136. The system memory 136 in some aspects may comprise double data rate (DDR) synchronous dynamic random access memory (SDRAM), as a non-limiting example.

The MMU 130 of FIG. 1 is responsible for performing VA-to-PA address translation operations in support of the virtual memory functionality of the processor-based device 100. In this regard, the MMU 130 according to some aspects may comprise a plurality of hierarchical page tables (not shown) containing page table entries that each represent a mapping for a subdivision of the addressable virtual memory space having a specific size (i.e., a memory page). The mappings stored by the page table entries of the hierarchical page tables of the MMU 130 may be cached in a plurality of TLB entries 138(0)-138(T) of the TLB 132. In this manner, frequently used VA-to-PA mappings do not have to be recalculated for every memory access request performed by the MMU 130.

The TLB 132 may cache VA-to-PA mappings for one of multiple stages of address translation that may performed by the processor-based device 100. For example, in some aspects the processor 102 may directly execute an operating system (OS) without using a hypervisor or a virtual machine (VM). In such aspects, the TLB 132 may cache the result of Stage 1 translations (i.e., mappings of VAs to PAs by the OS). Some aspects may provide that the processor 102 may execute a hypervisor (not shown) for providing virtualization functionality. Executing within the hypervisor may be a VM (not shown), within which a guest OS (not shown) is executing. In some such aspects, the TLB 132 may cache the result of Stage 1 translations (i.e., mappings of guest VAs to guest PAs ("intermediate physical addresses" or "IPAs") of the guest OS), in which case the term "virtual address" used herein may refer to a guest VA and the term "physical address" used herein may refer to an IPA. Some such aspects may provide that the TLB 132 caches the result of Stage 2 translations (i.e., mappings of IPAs to PAs by the hypervisor and/or a host OS), in which case the term "virtual address" used herein may refer to an IPA and the term "physical address" used herein may refer to a PA. The functionality described herein for exploiting VA spatial locality to provide TLB entry compression is equally applicable to the various aspects disclosed herein.

As noted above, while the use of the TLB 132 may be effective in reducing memory access latency within the processor 102, the TLB 132 may require a significant portion of the physical area of the processor 102. Thus, it may be desirable to reduce the area occupied by the TLB 132 without negatively affecting the performance of the TLB 132, and/or to improve the performance of the TLB 132 without increasing the physical footprint of the TLB 132. In this regard, in some exemplary aspects disclosed herein, the processor 102 is configured to effectively provide TLB compression by exploiting the tendency of VAs to exhibit spatial locality within a virtual memory space. In particular, each TLB entry of the plurality of TLB entries 138(0)-138 (T) of the TLB 132 is configured to store a tag 140(0), 140'(0) that includes a page VA (not shown), and to further store a plurality of data portions (captioned "DATA" in FIG. 1) 142(0)-142(D), 142'(0)-142'(D) that each store a page PA (not shown). Using the TLB entry 138(0) as an example, a first data portion, such as the data portion 142(0), stores a page PA that corresponds to the page VA of the tag 140(0) (i.e., the page PA resulting from an address translation operation for the page VA). The remaining data portions 142(1)-142(D) of the TLB entry 138(0) store page PAs that correspond to next sequential page VAs that follow the page VA of the tag. Thus, for example, the data portion 142(1) stores a page PA that corresponds to a next page VA that sequentially follows the page VA stored in the data portion 142(0), and so on in like fashion. Because the TLB entries 138(0)-138(T) store multiple data portions containing the PAs for sequential page VAs, the TLB 132 can occupy less area within the processor 102 while maintaining comparable performance to conventional TLBs, and/or can provide improved performance with minimal impact on the physical footprint of the TLB 132.

In some aspects, the PAs stored in the data portions 142(0)-142(D) and/or the data portions 142'(0)-142'(D) are guaranteed to be contiguous. For instance, in aspects in which the TLB 132 stores Stage 1 translations, the processing of a final descriptor and/or page table entry (PTE) for a VA will retrieve a cache line that will contain translations for data portions adjacent to the VA, allowing the data portions 142(0)-142(D) and/or the data portions 142'(0)-142'(D) to be populated. However, in some aspects such as those in which the TLB 132 stores Stage 1 and Stage 2 translations, the PAs stored in the data portions 142(0)-142(D) and/or the data portions 142'(0)-142'(D) may not be contiguous. As discussed in greater detail below with respect to FIG. 2, in such aspects the MMU 130 may subsequently prefetch address translations for the next sequential page VAs to populate the data portions 142(0)-142(D) and/or the data portions 142'(0)-142'(D).

Figure 2:
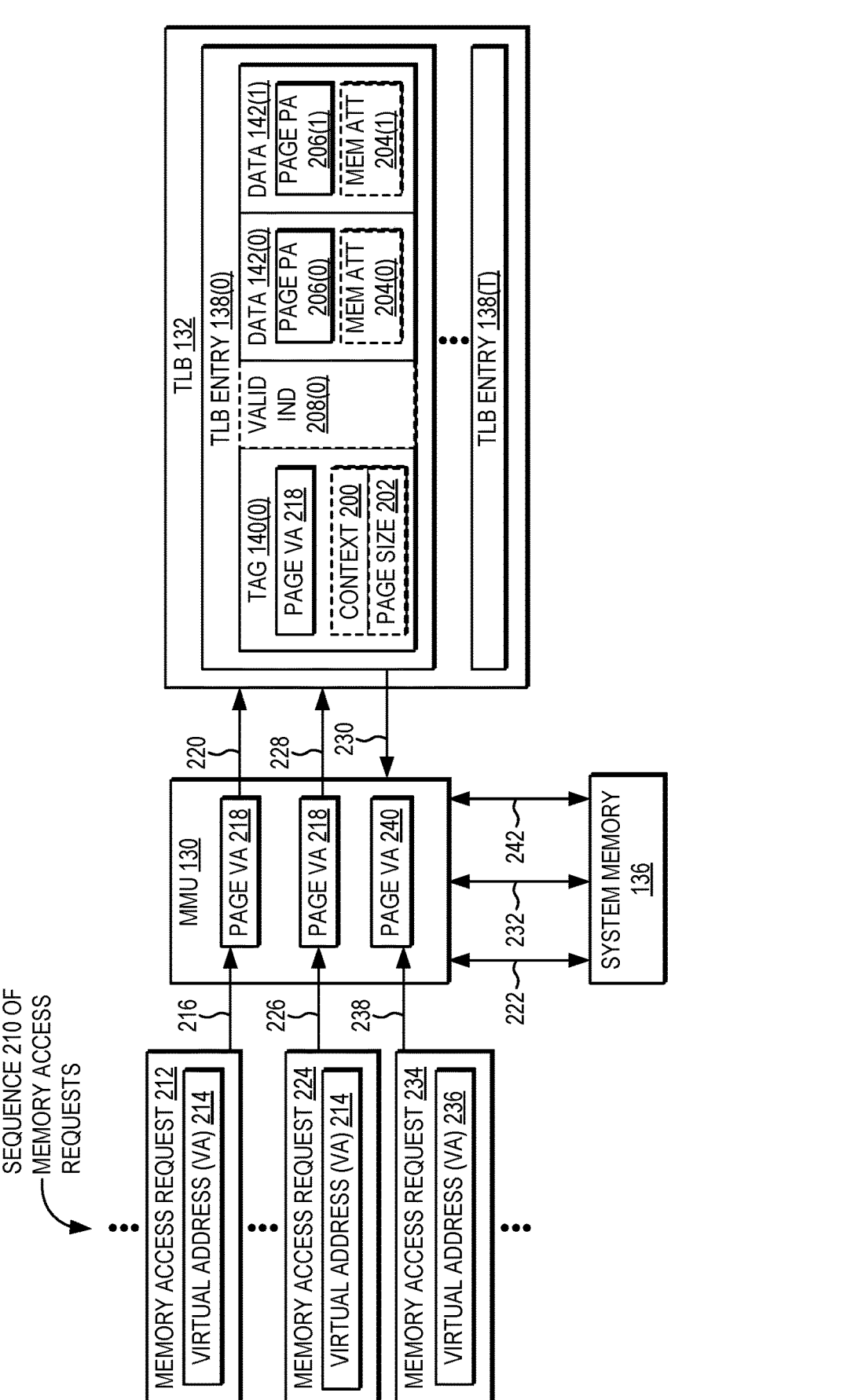
FIG. 2 is a block diagram illustrating exemplary operations and communications flow for using TLB entry compression, according to some aspects.

FIG. 2 illustrates exemplary operations of the MMU 130 and the TLB 132 of FIG. 1 for generating, populating, and using the TLB entries 138(0)-138(T) of FIG. 1. As seen in FIG. 2, the MMU 130, the system memory 136, the TLB 132, and the TLB entries 138(0)-138(T) of FIG. 1 are shown. The contents of the TLB entry 138(0) are shown in greater detail as comprising the tag 140(0) and the data portions 142(0) and 142(1). Although the TLB entry 138(0) shown in FIG. 2 contains only two data portions 142(0) and 142(1), it is to be understood that the exemplary operations described below apply to aspects in which the TLB entry 138(0) contains any integer number D of data portions 142(0)-142(D), where D>2.

Some aspects of the TLB 132 may provide that the tag 140(0) and the data portions 142(0) and 142(1) of TLB entries such as the TLB entry 138(0) may include additional information or metadata. For instance, the tag 140(0) may further include context data (captioned as "CONTEXT" in FIG. 2) 200 comprising information regarding an application and/or a VM with which the TLB entry 138(0) is associated, and/or a page size indicator (captioned as "PAGE SIZE" in FIG. 2) 202 indicating a size of the physical pages in the system memory 136. Similarly, the data portions 142(0) and 142(1) in some aspects may further include memory attributes (captioned as "MEM ATT" in FIGS. 2) 204(0) and 204(1), respectively, of the memory pages represented by page PAs 206(0) and 206(1), respectively. The TLB entry 138(0) itself may also include additional fields. Some aspects may provide that the TLB entry 138(0) may include valid indicators (captioned as "VALID IND" in FIG. 2) 208(0), which may comprise bit indicators that indicate whether the corresponding page PAs 206(0) and 206(1) represent valid address translations. It is to be understood that the TLB entry 138(0), the tag 140(0), and/or the data portions 142(0) and 142(1) may include other information or metadata not shown in FIG. 2.

In the example of FIG. 2, the MMU 130 is configured to process a sequence 210 of memory access requests resulting, e.g., from execution of memory load instructions and/or memory store instructions (not shown). The MMU 130 is configured to first receive a memory access request 212 (i.e., a memory read request or a memory write request) that comprises a VA 214, as indicated by arrow 216. The MMU 130 derives a page VA 218 of a virtual memory page of the VA 214, and performs a TLB access 220 to determine whether one of the TLB entries 138(0)-138(T) stores an address translation for the page VA 218. In this example, the MMU 130 determines that the TLB access 220 to the TLB 132 results in a miss, and thus the MMU 130 is configured to generate the TLB entry 138(0) for the page VA 218. The operations for generating the TLB entry 138(0) may include the MMU 130 first performing an address translation operation to obtain the page PA 206(0) that corresponds to the page VA 218, and then storing the page PA 206(0) in the data portion 142(0) of the TLB entry 138(0).

The MMU 130 then obtains a page PA 206(1) that corresponds to a next sequential page VA following the page VA 218. In aspects in which the page PAs 206(0) and 206(1) are contiguous in a physical memory space of the system memory 136, the MMU 130 may obtain the page PA 206(1) of the next sequential page VA following the page VA 218 based on the address translation operation that it performed to obtain the page PA 206(0). For example, the page PA 206(1) may be obtained in the course of performing conventional operations for address translation to obtain the page PA 206(0) (e.g., by obtaining descriptors (not shown) for the page PA 206(0) and the page PA 206(1) as part of the same address translation operation). In such aspects, the MMU 130 then stores the PA 206(1) of the next sequential page VA following the page VA 218 in the data portion 142(1) of the TLB entry 138(0). In aspects in which the page PAs 206(0) and 206(1) are not contiguous in a physical memory space of the system memory 136, the MMU 130 may subsequently prefetch an address translation for the next sequential page VA following the page VA 218 to obtain the page PA 206(1) (i.e., after making the TLB entry 138(0) available for use within the TLB 132). The MMU 130 in such aspects then updates the data portion 142(1) of the TLB entry 138(0) with the page PA 206(1). After generating the TLB entry 138(0), the MMU 130 performs a memory access operation 222 using the page PA 206(0) for the page VA 218 of the VA 214 (i.e., by using the page PA 206(0) to calculate a PA of the actual memory location to access).

The MMU 130 in FIG. 2 later receives a memory access request 224 comprising the VA 214, as indicated by arrow 226. The MMU 130 again derives the page VA 218 of the virtual memory page of the VA 214, and performs a TLB access 228 to determine whether one of the TLB entries 138(0)-138(T) stores an address translation for the page VA 218. The TLB access 228 results in a hit, and as a result, the MMU 130 accesses the TLB entry 138(0) as indicated by arrow 230 and performs a memory access operation 232 using the page PA 206(0) of the data portion 142(0) of the TLB entry 138(0). The MMU 130 also receives a memory access request 234 that comprises a VA 236, as indicated by arrow 238. The MMU 130 derives the page VA 240 of the virtual memory page of the VA 236, and determines that the page VA 240 corresponds to a next sequential page VA following the page VA 218. In response, the MMU 130 performs a subsequent memory access operation 242 using the page PA 206(1) of the data portion 142(1).

To illustrate operations performed by the MMU 130 and the TLB 132 of FIGS. 1 and 2 for exploiting VA spatial locality using TLB entry compression according to some aspects, FIGS. 3A and 3B provide a flowchart showing exemplary operations 300. For the sake of clarity, elements of FIGS. 1 and 2 are referenced in describing FIGS. 3A and 3B. It is to be understood that some aspects may provide that some operations illustrated in FIGS. 3A and 3B may be performed in an order other than that illustrated herein, and/or may be omitted. Operations in FIG. 3A begin with the processor-based device 100 of FIG. 1 (e.g., using the MMU 130 of FIG. 1) receiving a first memory access request (e.g., the memory access request 212 of FIG. 2) comprising a first VA (e.g., the VA 214 of FIG. 2) (block 302). The MMU 130 determines that a first TLB access (e.g., the TLB access 220 of FIG. 2) to a TLB (e.g., the TLB 132 of FIGS. 1 and 2) of the processor-based device 100 for a first page VA (e.g., the page VA 218 of FIG. 2) of the first VA 214 results in a miss (block 304).

In response to determining that the first TLB access 220 to the TLB 132 for the first page VA 218 of the first VA 214 results in the miss, the MMU 130 generates a TLB entry (e.g., the TLB entry 138(0) of FIGS. 1 and 2) for the first page VA 218 (block 306). The TLB entry 138(0) comprises a tag (e.g., the tag 140(0) of FIGS. 1 and 2) that comprises the first page VA 218, and also comprises a plurality of data portions (e.g., the plurality of data portions 142(0)-142(1) of FIGS. 1 and 2) that comprises a corresponding plurality of page PAs (e.g., the plurality of page PAs 206(0)-206(1) of FIG. 2). A first data portion of the plurality of data portions 142(0)-142(1), such as the data portion 142(0) of FIGS. 1 and 2, comprises a page PA (e.g., the page PA 206(0) of FIG. 2) corresponding to the first page VA 218. Additionally, one or more second data portions (e.g., the data portion 142(1) of FIGS. 1 and 2) of the plurality of data portions 142(0)-142(1) comprise corresponding one or more page PAs (e.g., the page PA 206(1) of FIG. 2) of corresponding next sequential page VAs following the first page VA 218 (block 306). The operations of block 306 for generating the TLB entry 138(0) in aspects in which the page PAs 206(0)-206(1) are contiguous in a physical memory space are discussed in greater detail below with respect to FIG. 4, while the operations of block 306 for generating the TLB entry 138(0) in aspects in which the page PAs 206(0)-206(1) are not contiguous in a physical memory space are discussed in greater detail below with respect to FIG. 5. The exemplary operations 300 in some aspects may continue at block 308 of FIG. 3B.

Turning now to FIG. 3B, the exemplary operations 300 according to some aspects may continue with the MMU 130 receiving a second memory access request (e.g., the memory access request 224 of FIG. 2) comprising the first VA 214 (block 308). The MMU 130 determines that a second TLB access (e.g., the TLB access 228 of FIG. 2) to the TLB 132 for the first page VA 218 of the first VA 214 results in a hit (block 310). In response, the MMU 130 performs a memory access operation (e.g., the memory access operation 232 of FIG. 2) using the page PA 206(0) of the first data portion 142(0) of the plurality of data portions 142(0)-142(1) of the TLB entry 138(0) (block 312). Some aspects may further provide that the MMU 130 receives a third memory access request (e.g., the memory access request 234 of FIG. 2) comprising a second VA (e.g., the VA 236 of FIG. 2) (block 314). The MMU 130 determines that a second page VA (e.g., the page VA 240 of FIG. 2) of the second VA 236 corresponds to a next sequential page VA following the first page VA 218 (block 316). In response, the MMU 130 performs a subsequent memory access operation (e.g., the memory access operation 242 of FIG. 2) using the page PA 206(1) of a second data portion (e.g., the data portion 142(1) of FIGS. 1 and 2) of the one or more second data portions 142(1) corresponding to the next sequential page VA (block 318).

FIG. 4 illustrates exemplary operations 400, corresponding to block 306 of FIG. 3A, that may be performed by the MMU 130 of FIGS. 1 and 2 for generating the TLB entry 138(0) in aspects in which the page PAs 206(0)-206(1) are contiguous in a physical memory space. For the sake of clarity, elements of FIGS. 1 and 2 are referenced in describing FIG. 4. In FIG. 4, the exemplary operations 400 begin with the MMU 130 first performing an address translation operation to obtain the page PA 206(0) corresponding to the first page VA 218 (block 402). The MMU 130 then stores the page PA 206(0) in the first data portion 142(0) of the TLB entry 138(0) (block 404). Next, the MMU 130 obtains the one or more page PAs 206(1) of the corresponding next sequential page VAs based on the address translation operation (block 406). As discussed above, the one or more page PAs 206(1) may be obtained in the course of performing conventional operations for address translation to obtain the page PA 206(0) (e.g., by obtaining descriptors for the page PAs 206(0)-206(1) as part of the same address translation operation). The MMU 130 then stores the one or more page PAs 206(1) of the corresponding next sequential page VAs in the one or more second data portions 142(1) of the TLB entry 138(0) (block 408).

To illustrate operations corresponding to block 306 of FIG. 3A, that may be performed by the MMU 130 of FIGS. 1 and 2 for generating the TLB entry 138(0) in aspects in which the page PAs 206(0)-206(1) are not contiguous in a physical memory space, FIG. 5 provides a flowchart showing exemplary operations 500. Elements of FIGS. 1 and 2 are referenced in describing FIG. 5 for the sake of clarity. The exemplary operations 500 begin in FIG. 5 with the MMU 130 performing an address translation operation to obtain the page PA 206(0) corresponding to the first page VA 218 (block 502). The MMU 130 next stores the page PA 206(0) in the first data portion 142(0) of the TLB entry 138(0) (block 504). The MMU 130 subsequently prefetches an address translation for each of the next sequential page VAs to obtain the one or more page PAs 206(1) of the corresponding next sequential page VAs (block 506). The MMU 130 then updates the one or more second data portions 142(1) of the TLB entry 138(0) with the one or more page PAs 206(1) of the corresponding next sequential page VAs (block 508).

The MMU and the TLB according to aspects disclosed herein and discussed with reference to FIGS. 1, 2, 3A-3B, 4, and 5 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
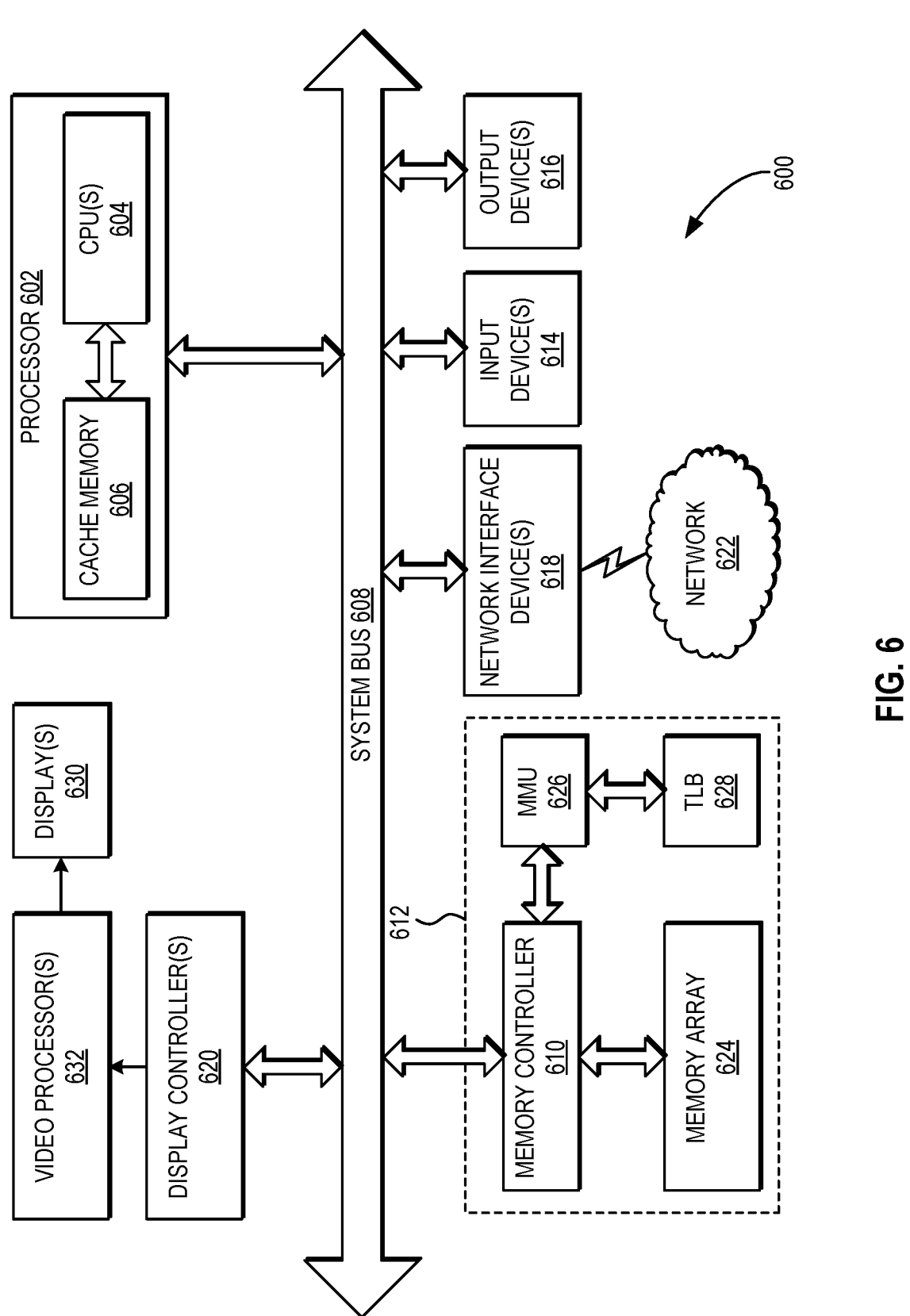
FIG. 6 is a block diagram of an exemplary processor-based device that can include the MMU and the TLB of FIGS. 1 and 2.

In this regard, FIG. 6 illustrates an example of a processor-based device 600 that includes an MMU and a TLB as illustrated and described with respect to FIGS. 1, 2, 3A-3B, 4 and 5. In this example, the processor-based device 600, which corresponds in functionality to the processor-based device 100 of FIG. 1, includes a processor 602 which comprises one or more CPUs 604 coupled to a cache memory 606. The CPU(s) 604 is also coupled to a system bus 608 and can intercouple devices included in the processor-based device 600. As is well known, the CPU(s) 604 communicates with these other devices by exchanging address, control, and data information over the system bus 608. For example, the CPU(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624 and an MMU 626 (such as, e.g., the MMU 130 of FIGS. 1 and 2), which may be coupled to a TLB 628 (e.g., the TLB 132 of FIGS. 1 and 2).

The CPU(s) 604 may also be configured to access the display controller(s) 620 over the system bus 608 to control information sent to one or more displays 630. The display controller(s) 620 sends information to the display(s) 630 to be displayed via one or more video processors 632, which process the information to be displayed into a format suitable for the display(s) 630. The display(s) 630 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
    a translation lookaside buffer (TLB) comprising a plurality of TLB entries, each TLB entry comprising a tag and a plurality of data portions; and
    a memory management unit (MMU) configured to:
        receive a first memory access request comprising a first virtual address (VA);
        determine that a first TLB access to the TLB for a first page VA of the first VA results in a miss; and
        responsive to determining that the first TLB access to the TLB for the first page VA of the first VA results in the miss, generate a TLB entry for the first page VA, wherein:
            the tag of the TLB entry comprises the first page VA;
            the plurality of data portions comprises a corresponding plurality of page physical addresses (PAs);
            a first data portion of the plurality of data portions comprises a page PA corresponding to the first page VA; and
            one or more second data portions of the plurality of data portions comprise corresponding one or more page PAs of corresponding next sequential page VAs following the first page VA.

2. The processor-based device of clause 1, wherein each TLB entry of the plurality of TLB entries further comprises a plurality of valid bits that each correspond to a data portion of the plurality of data portions.

3. The processor-based device of any of clauses 1-2, wherein:
    each page PA of the plurality of page PAs comprises one of a PA and an intermediate physical address (IPA);
    the plurality of page PAs are contiguous in a system memory; and
    the MMU is configured to generate the TLB entry for the first page VA by being configured to:
        perform an address translation operation to obtain the page PA corresponding to the first page VA;
        store the page PA in the first data portion of the TLB entry;
        obtain the one or more page PAs of the corresponding next sequential page VAs based on the address translation operation; and
        store the one or more page PAs of the corresponding next sequential page VAs in the one or more second data portions of the TLB entry.

4. The processor-based device of any of clauses 1-2, wherein:
    each page PA of the plurality of page PAs comprises an intermediate physical address (IPA);
    the plurality of page PAs are not contiguous in a system memory; and the MMU is configured to generate the TLB entry for the first page VA by being configured to:
        perform an address translation operation to obtain the page PA corresponding to the first page VA;
        store the page PA in the first data portion of the TLB entry;
        prefetch an address translation for each of the next sequential page VAs to obtain the one or more page PAs of the corresponding next sequential page VAs; and
        update the one or more second data portions of the TLB entry with the one or more page PAs of the corresponding next sequential page VAs.

5. The processor-based device of any of clauses 1-4, wherein the MMU is further configured to:
    receive a second memory access request comprising the first VA;
    determine that a second TLB access to the TLB for the first page VA of the first VA results in a hit;
    responsive to determining that the second TLB access to the TLB for the first page VA of the first VA results in the hit, perform a memory access operation using the page PA of the first data portion of the plurality of data portions of the TLB entry;
    receive a third memory access request comprising a second VA;
    determine that a second page VA of the second VA corresponds to a next sequential page VA following the first page VA; and
    responsive to determining that the second page VA of the second VA corresponds to the next sequential page VA following the first page VA, perform a subsequent memory access operation using the page PA of a second data portion of the one or more second data portions corresponding to the next sequential page VA.

6. The processor-based device of any of clauses 1-5, wherein the tag of the TLB entry further comprises one or more of a context and a page size.

7. The processor-based device of any of clauses 1-6, wherein the plurality of data portions each further comprises one or more memory attributes.

8. The processor-based device of any of clauses 1-7, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor-based device, comprising:
    means for receiving a first memory access request comprising a first virtual address (VA);
    means for determining that a first translation lookaside buffer (TLB) access to a TLB of the processor-based device for a first page VA of the first VA results in a miss; and means for generating a TLB entry for the first page VA responsive to determining that the first TLB access to the TLB for the first page VA of the first VA results in the miss, wherein:

the TLB entry comprises a tag that comprises the first page VA;

the TLB entry comprises a plurality of data portions that comprises a corresponding plurality of page physical addresses (PAs);

a first data portion of the plurality of data portions comprises a page PA corresponding to the first page VA; and one or more second data portions of the plurality of data portions comprise corresponding one or more page PAs of corresponding next sequential page VAs following the first page VA.

10. A method for exploiting virtual address (VA) spatial locality using translation lookaside buffer (TLB) entry compression, comprising:

receiving, by a memory management unit (MMU) of a processor-based device, a first memory access request comprising a first VA;

determining, by the MMU, that a first TLB access to a TLB of the processor-based device for a first page VA of the first VA results in a miss; and responsive to determining that the first TLB access to the TLB for the first page VA of the first VA results in the miss, generating, by the MMU, a TLB entry for the first page VA, wherein:

the TLB entry comprises a tag that comprises the first page VA;

the TLB entry comprises a plurality of data portions that comprises a corresponding plurality of page physical addresses (PAs);

a first data portion of the plurality of data portions comprises a page PA corresponding to the first page VA; and one or more second data portions of the plurality of data portions comprise corresponding one or more page PAs of corresponding next sequential page VAs following the first page VA.

11. The method of clause 10, wherein each TLB entry of a plurality of TLB entries further comprises a plurality of valid bits that each correspond to a data portion of the plurality of data portions.

12. The method of any of clauses 10-11, wherein:

each page PA of the plurality of page PAs comprises one of a PA and an intermediate physical address (IPA);

the plurality of page PAs are contiguous in a system memory; and generating the TLB entry for the first page VA comprises:

performing an address translation operation to obtain the page PA corresponding to the first page VA;

storing the page PA in the first data portion of the TLB entry;

obtaining the one or more page PAs of the corresponding next sequential page VAs based on the address translation operation; and storing the one or more page PAs of the corresponding next sequential page VAs in the one or more second data portions of the TLB entry.

13. The method of any of clauses 10-11, wherein:

each page PA of the plurality of page PAs comprises an intermediate physical address (IPA);

the plurality of page PAs are not contiguous in a system memory; and generating the TLB entry for the first page VA comprises:

performing an address translation operation to obtain the page PA corresponding to the first page VA;

storing the page PA in the first data portion of the TLB entry;

prefetching an address translation for each of the next sequential page VAs to obtain the one or more page PAs of the corresponding next sequential page VAs; and updating the one or more second data portions of the TLB entry with the one or more page PAs of the corresponding next sequential page VAs.

14. The method of any of clauses 10-13, further comprising:

receiving, by the MMU, a second memory access request comprising the first VA;

determining, by the MMU, that a second TLB access to the TLB for the first page VA of the first VA results in a hit;

responsive to determining that the second TLB access to the TLB for the first page VA of the first VA results in the hit, performing, by the MMU, a memory access operation using the page PA of the first data portion of the plurality of data portions of the TLB entry;

receiving, by the MMU, a third memory access request comprising a second VA;

determining, by the MMU, that a second page VA of the second VA corresponds to a next sequential page VA following the first page VA; and responsive to determining that the second page VA of the second VA corresponds to the next sequential page VA following the first page VA, performing, by the MMU, a subsequent memory access operation using the page PA of a second data portion of the one or more second data portions corresponding to the next sequential page VA.

15. The method of any of clauses 10-14, wherein the tag of the TLB entry further comprises one or more of a context and a page size.

16. The method of any of clauses 10-15, wherein the plurality of data portions each further comprises one or more memory attributes.

17. A non-transitory computer-readable medium, having stored thereon computer-executable instructions that, when executed, cause a processor of a processor-based device to:

receive a first memory access request comprising a first virtual address (VA);

determine that a first translation lookaside buffer (TLB) access to a TLB of the processor-based device for a first page VA of the first VA results in a miss; and responsive to determining that the first TLB access to the TLB for the first page VA of the first VA results in the miss, generate a TLB entry for the first page VA, wherein:

the TLB entry comprises a tag that comprises the first page VA;

the TLB entry comprises a plurality of data portions that comprises a corresponding plurality of page physical addresses (PAs);

a first data portion of the plurality of data portions comprises a page PA corresponding to the first page VA; and one or more second data portions of the plurality of data portions comprise corresponding one or more page PAs of corresponding next sequential page VAs following the first page VA.

18. The non-transitory computer-readable medium of clause 17, wherein:

each page PA of the plurality of page PAs comprises one of a PA and an intermediate physical address (IPA);

the plurality of page PAs are contiguous in a system memory; and the computer-executable instructions cause the processor to generate the TLB entry for the first page VA by causing the processor to:

perform an address translation operation to obtain the page PA corresponding to the first page VA;

store the page PA in the first data portion of the TLB entry;

obtain the one or more page PAs of the corresponding next sequential page VAs based on the address translation operation; and store the one or more page PAs of the corresponding next sequential page VAs in the one or more second data portions of the TLB entry.

19. The non-transitory computer-readable medium of clause 17, wherein:

each page PA of the plurality of page PAs comprises one of a PA and an intermediate physical address (IPA);

the plurality of page PAs are not contiguous in a system memory; and the computer-executable instructions cause the processor to generate the TLB entry for the first page VA by causing the processor to:

perform an address translation operation to obtain the page PA corresponding to the first page VA;

store the page PA in the first data portion of the TLB entry;

prefetch an address translation for each of the next sequential page VAs to obtain the one or more page PAs of the corresponding next sequential page VAs; and update the one or more second data portions of the TLB entry with the one or more page PAs of the corresponding next sequential page VAs.

20. The non-transitory computer-readable medium of any of clauses 17-19, wherein the computer-executable instructions further cause the processor to:

receive a second memory access request comprising the first VA;

determine that a second TLB access to the TLB for the first page VA of the first VA results in a hit;

responsive to determining that the second TLB access to the TLB for the first page VA of the first VA results in the hit, perform a memory access operation using the page PA of the first data portion of the plurality of data portions of the TLB entry;

receive a third memory access request comprising a second VA;

determine that a second page VA of the second VA corresponds to a next sequential page VA following the first page VA; and responsive to determining that the second page VA of the second VA corresponds to the next sequential page VA following the first page VA, perform a subsequent memory access operation using the page PA of a second data portion of the one or more second data portions corresponding to the next sequential page VA.

What is claimed is:

1. A processor-based device, comprising:

a translation lookaside buffer (TLB) comprising a plurality of TLB entries, each TLB entry comprising a tag and a plurality of data portions; and a memory management unit (MMU) configured to:

receive a first memory access request comprising a first virtual address (VA);

determine that a first TLB access to the TLB for a first page VA of the first VA results in a miss; and responsive to determining that the first TLB access to the TLB for the first page VA of the first VA results in the miss, generate a TLB entry for the first page VA, wherein:

the plurality of data portions comprises a corresponding plurality of page physical addresses (PAs);

a first data portion of the plurality of data portions comprises a page PA corresponding to the first page VA;

one or more second data portions of the plurality of data portions comprise corresponding one or more page PAs of corresponding next sequential page VAs following the first page VA; and the tag of the TLB entry comprises the first page VA and none of the next sequential page VAs following the first page VA.

2. The processor-based device of claim 1, wherein each TLB entry of the plurality of TLB entries further comprises a plurality of valid bits that each correspond to a data portion of the plurality of data portions.

3. The processor-based device of claim 1, wherein:

each page PA of the plurality of page PAs comprises one of a PA and an intermediate physical address (IPA);

the plurality of page PAs are contiguous in a system memory; and the MMU is configured to generate the TLB entry for the first page VA by being configured to:

perform an address translation operation to obtain the page PA corresponding to the first page VA;

store the page PA in the first data portion of the TLB entry;

obtain the one or more page PAs of the corresponding next sequential page VAs based on the address translation operation; and store the one or more page PAs of the corresponding next sequential page VAs in the one or more second data portions of the TLB entry.

4. The processor-based device of claim 1, wherein:

each page PA of the plurality of page PAs comprises an intermediate physical address (IPA);

the plurality of page PAs are not contiguous in a system memory; and the MMU is configured to generate the TLB entry for the first page VA by being configured to:

perform an address translation operation to obtain the page PA corresponding to the first page VA;

store the page PA in the first data portion of the TLB entry;

prefetch an address translation for each of the next sequential page VAs to obtain the one or more page PAs of the corresponding next sequential page VAs; and update the one or more second data portions of the TLB entry with the one or more page PAs of the corresponding next sequential page VAs.

5. The processor-based device of claim 1, wherein the MMU is further configured to:

receive a second memory access request comprising the first VA;

determine that a second TLB access to the TLB for the first page VA of the first VA results in a hit;

responsive to determining that the second TLB access to the TLB for the first page VA of the first VA results in the hit, perform a memory access operation using the page PA of the first data portion of the plurality of data portions of the TLB entry;

receive a third memory access request comprising a second VA;

determine that a second page VA of the second VA corresponds to a next sequential page VA following the first page VA; and responsive to determining that the second page VA of the second VA corresponds to the next sequential page VA following the first page VA, perform a subsequent memory access operation using the page PA of a second data portion of the one or more second data portions corresponding to the next sequential page VA.

6. The processor-based device of claim 1, wherein the tag of the TLB entry further comprises one or more of a context and a page size.

7. The processor-based device of claim 1, wherein the plurality of data portions each further comprises one or more memory attributes.

8. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor-based device, comprising:

means for receiving a first memory access request comprising a first virtual address (VA);

means for determining that a first translation lookaside buffer (TLB) access to a TLB of the processor-based device for a first page VA of the first VA results in a miss; and means for generating a TLB entry for the first page VA responsive to determining that the first TLB access to the TLB for the first page VA of the first VA results in the miss, wherein:

the TLB entry comprises a plurality of data portions that comprises a corresponding plurality of page physical addresses (PAs);

a first data portion of the plurality of data portions comprises a page PA corresponding to the first page VA;

one or more second data portions of the plurality of data portions comprise corresponding one or more page PAs of corresponding next sequential page VAs following the first page VA; and the TLB entry comprises a tag that comprises the first page VA and none of the next sequential page VAs following the first page VA.

10. A method for exploiting virtual address (VA) spatial locality using translation lookaside buffer (TLB) entry compression, comprising:

receiving, by a memory management unit (MMU) of a processor-based device, a first memory access request comprising a first VA;

determining, by the MMU, that a first TLB access to a TLB of the processor-based device for a first page VA of the first VA results in a miss; and responsive to determining that the first TLB access to the TLB for the first page VA of the first VA results in the miss, generating, by the MMU, a TLB entry for the first page VA, wherein:

the TLB entry comprises a plurality of data portions that comprises a corresponding plurality of page physical addresses (PAs);

a first data portion of the plurality of data portions comprises a page PA corresponding to the first page VA;

one or more second data portions of the plurality of data portions comprise corresponding one or more page PAs of corresponding next sequential page VAs following the first page VA; and the TLB entry comprises a tag that comprises the first page VA and none of the next sequential page VAs following the first page VA.

11. The method of claim 10, wherein each TLB entry of a plurality of TLB entries further comprises a plurality of valid bits that each correspond to a data portion of the plurality of data portions.

12. The method of claim 10, wherein:

each page PA of the plurality of page PAs comprises one of a PA and an intermediate physical address (IPA);

the plurality of page PAs are contiguous in a system memory; and generating the TLB entry for the first page VA comprises:

performing an address translation operation to obtain the page PA corresponding to the first page VA;

storing the page PA in the first data portion of the TLB entry;

obtaining the one or more page PAs of the corresponding next sequential page VAs based on the address translation operation; and storing the one or more page PAs of the corresponding next sequential page VAs in the one or more second data portions of the TLB entry.

13. The method of claim 10, wherein:

each page PA of the plurality of page PAs comprises an intermediate physical address (IPA);

the plurality of page PAs are not contiguous in a system memory; and generating the TLB entry for the first page VA comprises:

performing an address translation operation to obtain the page PA corresponding to the first page VA;

storing the page PA in the first data portion of the TLB entry;

prefetching an address translation for each of the next sequential page VAs to obtain the one or more page PAs of the corresponding next sequential page VAs; and updating the one or more second data portions of the TLB entry with the one or more page PAs of the corresponding next sequential page VAs.

14. The method of claim 10, further comprising:

receiving, by the MMU, a second memory access request comprising the first VA;

determining, by the MMU, that a second TLB access to the TLB for the first page VA of the first VA results in a hit;

responsive to determining that the second TLB access to the TLB for the first page VA of the first VA results in the hit, performing, by the MMU, a memory access operation using the page PA of the first data portion of the plurality of data portions of the TLB entry;

receiving, by the MMU, a third memory access request comprising a second VA;

determining, by the MMU, that a second page VA of the second VA corresponds to a next sequential page VA following the first page VA; and responsive to determining that the second page VA of the second VA corresponds to the next sequential page VA following the first page VA, performing, by the MMU, a subsequent memory access operation using the page PA of a second data portion of the one or more second data portions corresponding to the next sequential page VA.

15. The method of claim 10, wherein the tag of the TLB entry further comprises one or more of a context and a page size.

16. The method of claim 10, wherein the plurality of data portions each further comprises one or more memory attributes.

17. A non-transitory computer-readable medium, having stored thereon computer-executable instructions that, when executed, cause a processor of a processor-based device to:

receive a first memory access request comprising a first virtual address (VA);

determine that a first translation lookaside buffer (TLB) access to a TLB of the processor-based device for a first page VA of the first VA results in a miss; and responsive to determining that the first TLB access to the TLB for the first page VA of the first VA results in the miss, generate a TLB entry for the first page VA, wherein:

the TLB entry comprises a plurality of data portions that comprises a corresponding plurality of page physical addresses (PAS);

a first data portion of the plurality of data portions comprises a page PA corresponding to the first page VA;

one or more second data portions of the plurality of data portions comprise corresponding one or more page PAs of corresponding next sequential page VAs following the first page VA; and the TLB entry comprises a tag that comprises the first page VA and none of the next sequential page VAs following the first page VA.

18. The non-transitory computer-readable medium of claim 17, wherein:

each page PA of the plurality of page PAs comprises one of a PA and an intermediate physical address (IPA);

the plurality of page PAs are contiguous in a system memory; and the computer-executable instructions cause the processor to generate the TLB entry for the first page VA by causing the processor to:

perform an address translation operation to obtain the page PA corresponding to the first page VA;

store the page PA in the first data portion of the TLB entry;

obtain the one or more page PAs of the corresponding next sequential page VAs based on the address translation operation; and store the one or more page PAs of the corresponding next sequential page VAs in the one or more second data portions of the TLB entry.

19. The non-transitory computer-readable medium of claim 17, wherein:

each page PA of the plurality of page PAs comprises one of a PA and an intermediate physical address (IPA);

the plurality of page PAs are not contiguous in a system memory; and the computer-executable instructions cause the processor to generate the TLB entry for the first page VA by causing the processor to:

perform an address translation operation to obtain the page PA corresponding to the first page VA;

store the page PA in the first data portion of the TLB entry;

prefetch an address translation for each of the next sequential page VAs to obtain the one or more page PAs of the corresponding next sequential page VAs; and update the one or more second data portions of the TLB entry with the one or more page PAs of the corresponding next sequential page VAs.

20. The non-transitory computer-readable medium of claim 17, wherein the computer-executable instructions further cause the processor to:

receive a second memory access request comprising the first VA;

determine that a second TLB access to the TLB for the first page VA of the first VA results in a hit;

responsive to determining that the second TLB access to the TLB for the first page VA of the first VA results in the hit, perform a memory access operation using the page PA of the first data portion of the plurality of data portions of the TLB entry;

receive a third memory access request comprising a second VA;

determine that a second page VA of the second VA corresponds to a next sequential page VA following the first page VA; and responsive to determining that the second page VA of the second VA corresponds to the next sequential page VA following the first page VA, perform a subsequent memory access operation using the page PA of a second data portion of the one or more second data portions corresponding to the next sequential page VA.

* * * * *